(12) United States Patent
Zhuang et al.

(10) Patent No.: US 10,137,896 B2
(45) Date of Patent: Nov. 27, 2018

(54) METHOD AND SYSTEM FOR OPERATING AUTONOMOUS DRIVING VEHICLES USING GRAPH-BASED LANE CHANGE GUIDE

(71) Applicant: Baidu USA LLC, Sunnyvale, CA (US)

(72) Inventors: Li Zhuang, Santa Clara, CA (US);
Guang Yang, San Jose, CA (US);
Jingao Wang, Saratoga, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 0 days.

(21) Appl. No.: 15/396,211

(22) Filed: Dec. 30, 2016

(65) Prior Publication Data

US 2018/0186378 A1 Jul. 5, 2018

(51) Int. Cl.
| | |
|---|---|
| *B60W 30/18* | (2012.01) |
| *B60W 30/09* | (2012.01) |
| *G01C 21/32* | (2006.01) |
| *G01C 21/34* | (2006.01) |
| *G05D 1/02* | (2006.01) |
| *B60W 30/095* | (2012.01) |
| *G01C 21/36* | (2006.01) |
| *G05D 1/00* | (2006.01) |

(52) U.S. Cl.
CPC .... *B60W 30/18163* (2013.01); *B60W 30/095* (2013.01); *G01C 21/32* (2013.01); *G01C 21/3446* (2013.01); *G01C 21/3453* (2013.01); *G01C 21/3658* (2013.01); *G05D 1/0088* (2013.01); *G05D 1/0212* (2013.01)

(58) Field of Classification Search
CPC ........ G05D 1/00; G05D 1/0088; G01C 21/24; G01C 21/34; B60W 30/18163
See application file for complete search history.

(56) References Cited

U.S. PATENT DOCUMENTS

2001/0021895 A1* 9/2001 Yamazaki .......... G01C 21/3461
701/435
2010/0299013 A1* 11/2010 Dolgov ................ G05D 1/0274
701/25

* cited by examiner

*Primary Examiner* — Yonel Beaulieu
*Assistant Examiner* — Martin A Weeks
(74) *Attorney, Agent, or Firm* — Womble Bond Dickinson (US) LLP (57) ABSTRACT

In one embodiment, autonomous driving control is provided for an autonomous vehicle changing from a source lane to a target lane. Using a topological map, a reference node is selected in the source lane. With respect to the reference node, an earliest node is determined in the source lane at which it is first possible for the vehicle to change lanes and a last node is determined in the source lane after which it is no longer possible to change lanes. A range of the source lane is determined for which the vehicle can change lanes.

21 Claims, 9 Drawing Sheets

FIG. 9

METHOD AND SYSTEM FOR OPERATING AUTONOMOUS DRIVING VEHICLES USING GRAPH-BASED LANE CHANGE GUIDE

TECHNICAL FIELD

Embodiments of the present disclosure relate generally to operating autonomous vehicles. More particularly, embodiments herein relate to operating an autonomous driving vehicle using a graph-based lane change guide.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. However, conventional motion planning operations estimate the difficulty of completing a given path mainly from its curvature and speed, without considering the differences in features for different types of vehicles. Often, the same motion planning and control is applied to all types of vehicles, which may not be accurate and smooth under some circumstances.

BRIEF DESCRIPTION OF THE DRAWINGS

Embodiments of the present disclosure are illustrated by way of example and not limitation in the figures of the accompanying drawings in which like references indicate similar elements.

DETAILED DESCRIPTION

Various embodiments and aspects will be described with reference to details discussed below, and the accompanying drawings will illustrate the various embodiments. The following description and drawings are illustrative of the embodiments and are not to be construed as limiting. Numerous specific details are described to provide a thorough understanding of various embodiments disclosed herein. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment.

According to some embodiments herein, autonomous driving control is provided for an autonomous vehicle changing from a source lane to a target lane. Using a topological map, a reference node is selected in the source lane. With respect to the reference node, an earliest node is determined in the source lane at which it is first possible for the vehicle to change lanes and a last node is determined in the source lane after which it is no longer possible to change lanes. A range of the source lane is determined for which the vehicle can change lanes.

Figure 1:
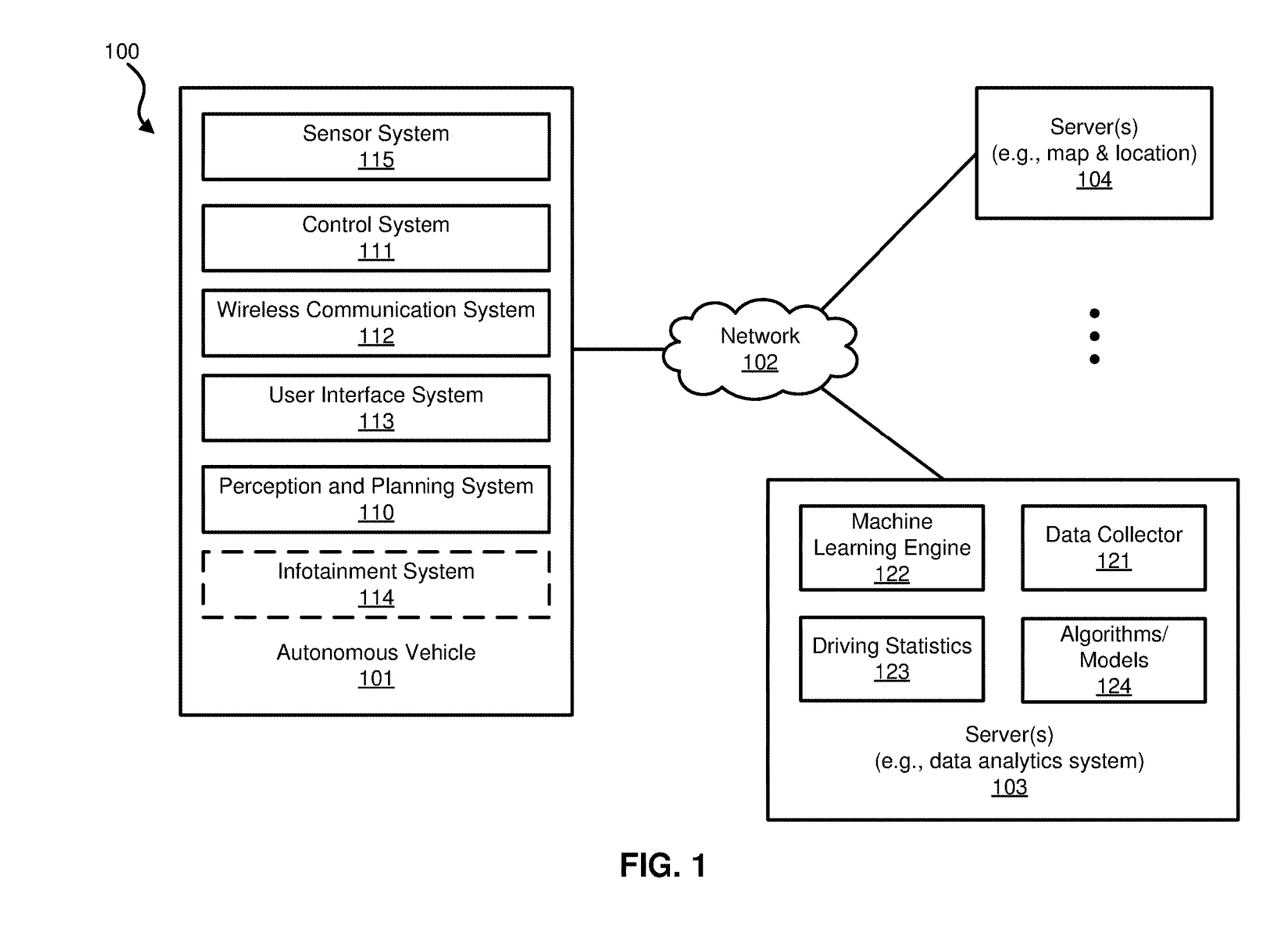
FIG. 1 is a block diagram illustrating a networked system according to one embodiment.

FIG. 1 is a block diagram illustrating an autonomous vehicle network configuration according to one embodiment. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc. In the embodiment of FIG. 1, server 103 includes machine learning engine 122, data collector 121, driving statistics 123 and algorithms and models 124. For example, algorithms and models 124 may include a graph-based lane change guide for determining a range of a source lane from which a vehicle can change lane to a target lane appropriately. The techniques of creating and utilizing a graph-based lane change guide will be described in details further below.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
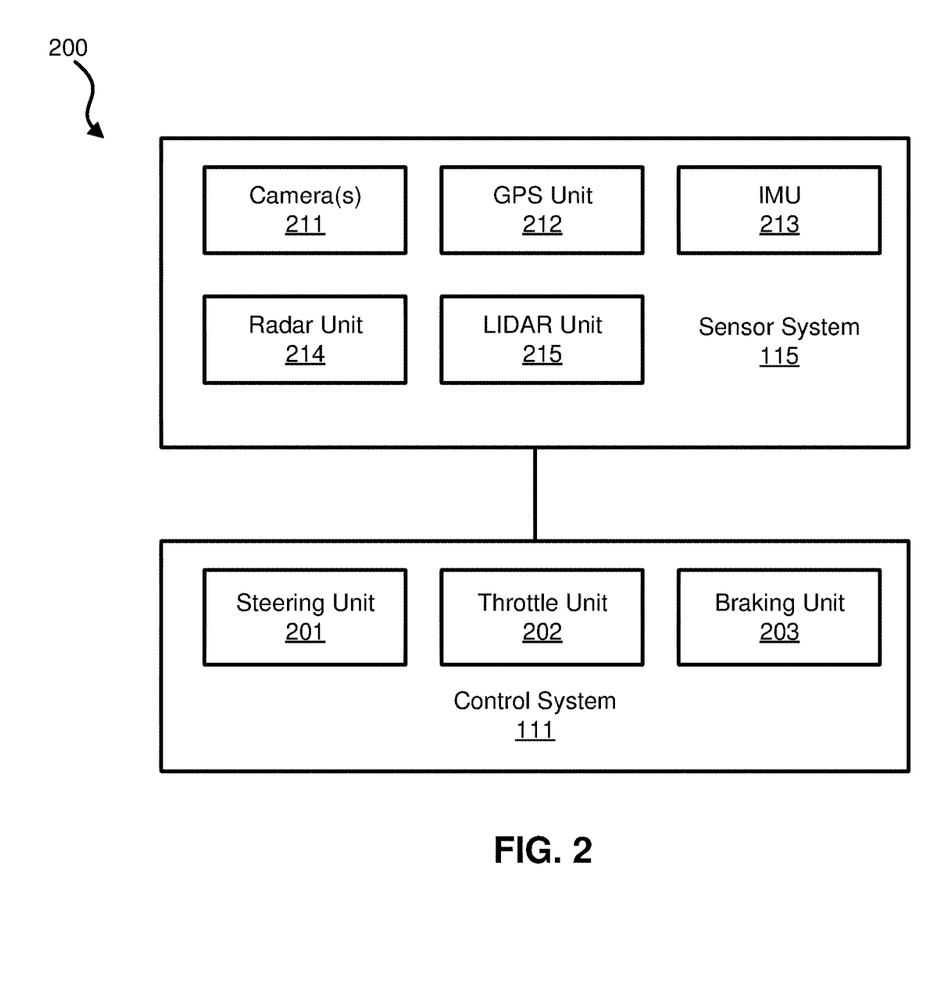
FIG. 2 is a block diagram illustrating an example of an autonomous vehicle according to one embodiment.

Referring now to FIG. 2, in one embodiment, system 200 may be implemented as a part of autonomous vehicle 101. System 200 may include sensor system 115 and control system 111. Sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 allows communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

According to one embodiment, autonomous vehicle 101 may further include infotainment system 114 to provide information and entertainment to passengers of vehicle 101. The information and entertainment content may be received, compiled, and rendered based on content information stored locally and/or remotely (e.g., provided by servers 103-104). For example, the information may be streamed in real-time from any of servers 103-104 over network 102 and displayed on a display device of vehicle 101. The information may be augmented with local information captured in real-time, for example, by one or more cameras and the augmented content can then be displayed in a virtual reality manner.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. The starting location and the destination location may be represented as nodes on a topological map, such as nodes 406 and 408, respectively, of FIG. 4. Multi-destination programming may also be supported. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Planning of the optimal route and driving of vehicle 101 may also include planning for a lane change from a source lane to a target lane. In order to plan the route for such a lane change, in one embodiment, a topological graph is built based on information from a map. The topological graph, which may also be considered a road graph, may be generated offline by a data analytics system such as data analytics system 103. Since the graph includes topological information, it may be smaller in size than the map itself. The graph may then be used to generate lane change information. Generation of a topological map is discussed in more detail with respect to FIG. 8, and one example of a topological map is discussed in more detail with respect to FIG. 4.

Figure 4:
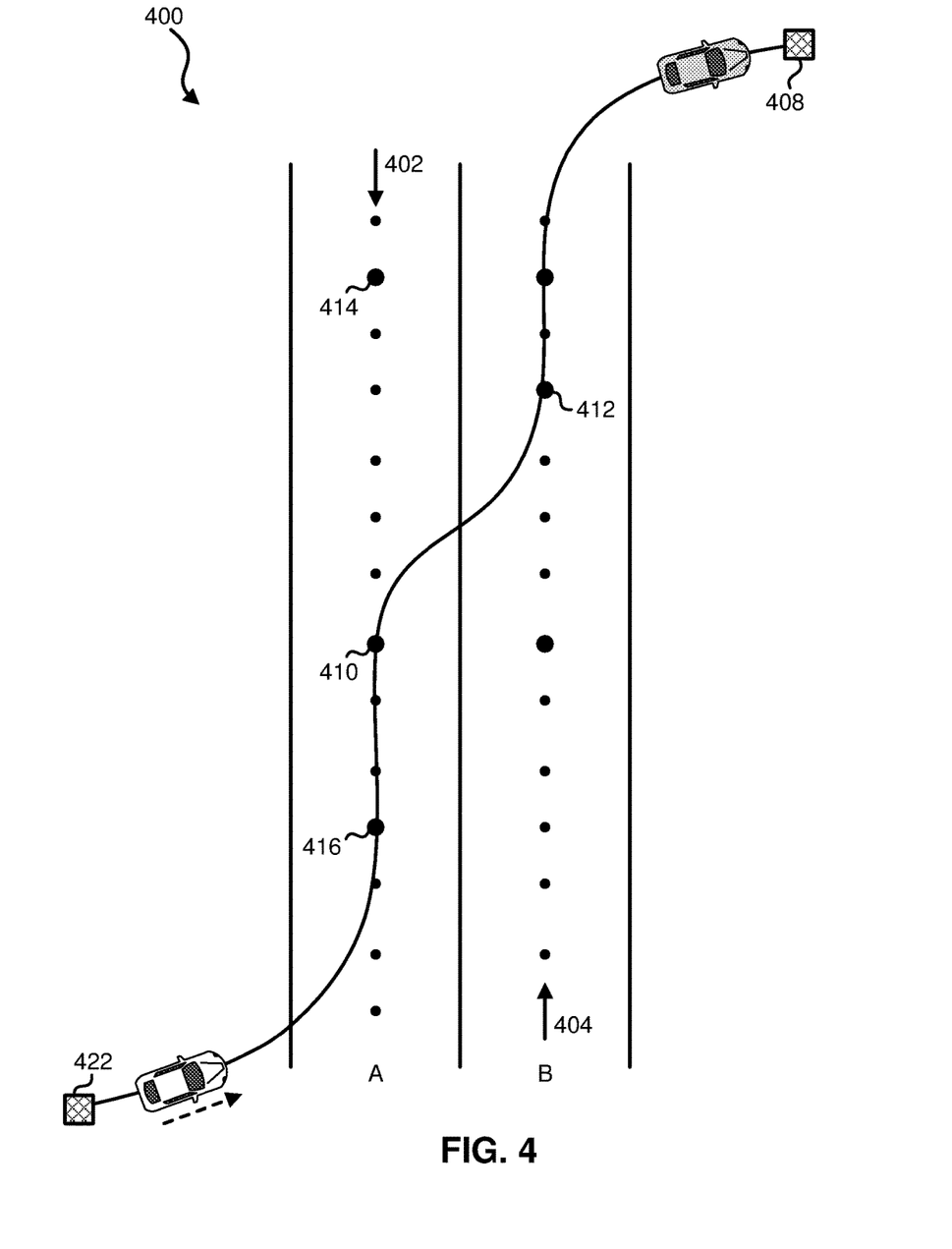
FIG. 4 is a representation illustrating an example of a topological graph according to one embodiment.

In one embodiment, the topological graph (e.g., graph 400) is generated to include a line approximately in the center of each lane in the graph (e.g., central lines 402, 404). In one embodiment, the central line may comprise nodes at an interval along the center of the lane. For example, the central line may comprise nodes spaced at every 3.5 meters. To determine a route for changing lanes, a point may be selected in the source lane which corresponds to a node in the source lane (e.g., 410). This point may then be projected to a node in the target lane B. In one embodiment, the projected node is the nearest node in the target lane B to which vehicle 101 may change position to from the source lane A (e.g., 412).

The edge from the first node in the source lane to the nearest node in the target lane may be considered a route for the vehicle 101 to change lanes. Thus, the first node may be considered the point in the source lane at which vehicle 101 changes lanes. However, in some cases it may be beneficial to provide a range of the source lane in which vehicle 101 may change lanes, rather than a single node. For example, in reality it may not be possible for vehicle 101 to change lanes at an exact point. In addition, a planned route may need to be rerouted due to real-time traffic and real-time local environment data detected or sensed by sensor system 115. Also based on real-time traffic and real-time local environment data, it may be desirable to have vehicle 101 change lanes before the selected first node or after the selected first node, such as in cases where vehicle 101 slows its speed to allow another vehicle to pass in the target lane or vehicle 101 increases its speed to change lanes ahead of another vehicle in the target lane.

By virtue of the embodiments described herein, it is typically possible to provide a weighted topological graph from which it is possible to determine lane-level routing between points in lanes. The precise routing information, which includes guide information for each lane change, may be provided to the perception and planning system 110 to plan a path from a starting point to a destination point, with greater ease, speed and efficiency than conventional methods. In one embodiment, the lane change guide information includes a range of the source lane for which it is possible for the vehicle 101 to change lanes from the source lane to a target lane. In one embodiment, the lane change guide information includes a range of the target lane for which it is possible for the vehicle 101 to change lanes from the source lane to the target lane. It is also typically possible to provide a routing module that re-reroutes, for example if heavy traffic is detected, as well as intelligent routing with transit points (e.g. gas or charging stations) by considering energy usage. In one embodiment, routing preferences are customizable by the user.

Figure 3:
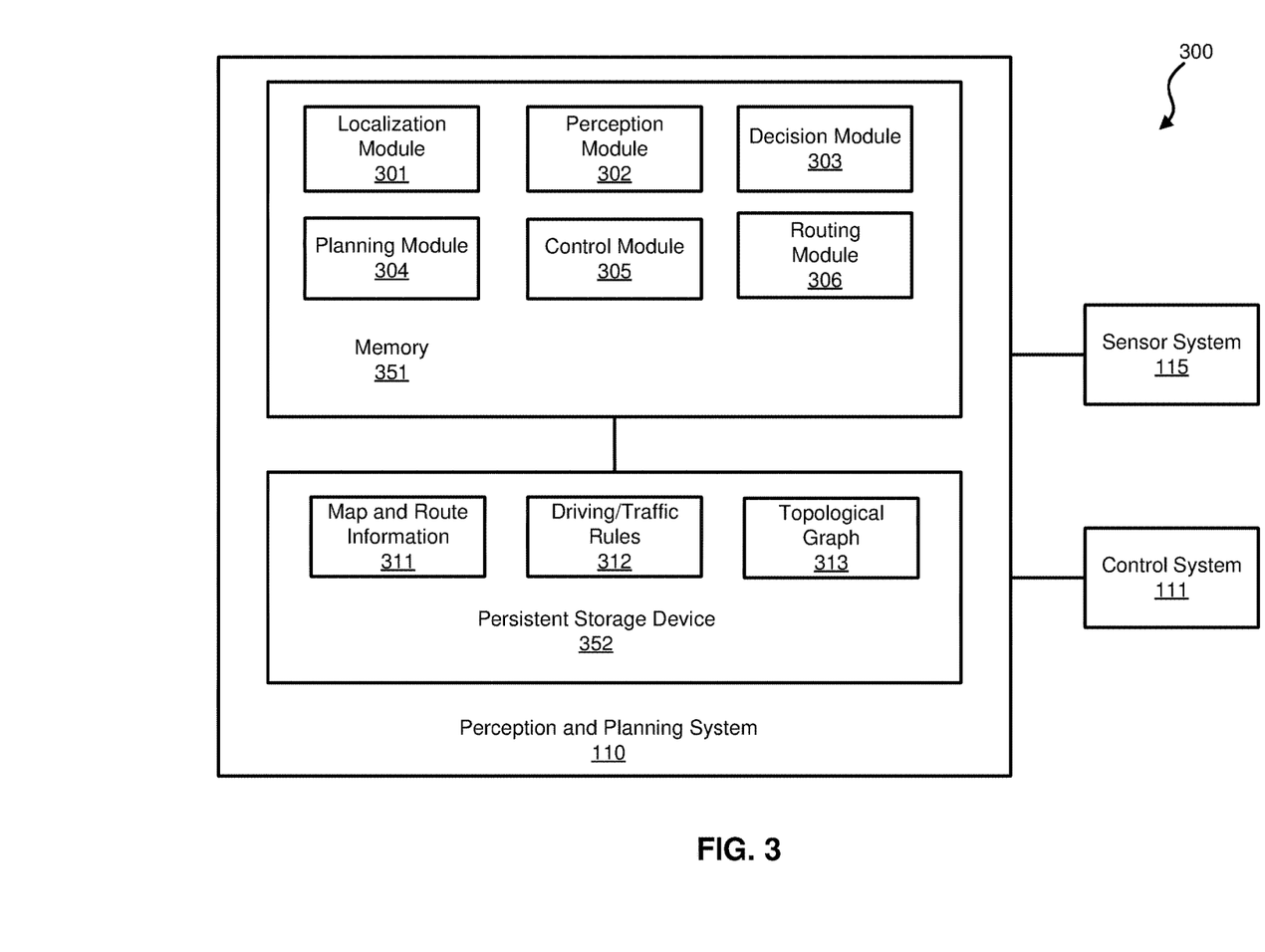
FIG. 3 is a block diagram illustrating an example of a perception and planning system used with an autonomous vehicle according to one embodiment.

FIG. 3 is a block diagram illustrating an example of a perception and planning system 300 used with an autonomous vehicle 101 according to one embodiment. System 300 may be implemented as a part of autonomous vehicle 101 of FIG. 1 including, but is not limited to, perception and planning system 110, control system 111, and sensor system 115. Referring to FIG. 3, perception and planning system 110 includes, but is not limited to, localization module 301, perception module 302, decision module 303, planning module 304, control module 305, and routing module 306.

Some or all of modules 301-306 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-306 may be integrated together as an integrated module.

Localization module 301 (also referred to as a map and route module) manages any data related to a trip or route of a user. A user may log in and specify a starting location and a destination of a trip, for example, via a user interface. Localization module 301 communicates with other components of system 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While the autonomous vehicle including system 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar unit 214 and/or LIDAR unit 215.

For each of the objects, decision module 303 makes a decision regarding how to handle the object. For example, for a particular object (e.g., another vehicle in a crossing route) as well as its metadata describing the object (e.g., a speed, direction, turning angle), decision module 303 decides how to encounter the object (e.g., overtake, yield, stop, pass). Decision module 303 may make such decisions according to a set of rules such as driving/traffic rules 312, which may be stored in persistent storage device 352.

Based on a decision for each of the objects perceived, planning module 304 plans a path or route for the autonomous vehicle, as well as driving parameters (e.g., distance, speed, and/or turning angle). That is, for a given object, decision module 303 decides what to do with the object, while planning module 304 determines how to do it. For example, for a given object, decision module 303 may decide to pass the object, while planning module 304 may determine whether to pass on the left side or right side of the object. Planning and control data is generated by planning module 304 including information describing how vehicle 101 including system 300 would move in a next moving cycle (e.g., next route/path segment). For example, the planning and control data may instruct vehicle 101 including system 300 to move 10 meters at a speed of 30 mile per hour (mph), then change to a right lane at the speed of 25 mph.

Based on the planning and control data, control module 305 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

Note that decision module 303 and planning module 304 may be integrated as an integrated module. Decision module 303/planning module 304 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 303/planning module 304 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

Routing module 306 may receive as input map and route information 311. The routing information provided by routing module 306 may include guide information for each lane change in the route including ranges of the source and target lanes for which it is possible for the vehicle to change lanes.

In one embodiment, central lines of each of the lanes in topological graph 400 are divided into segments. Routing module 306 may generally merge segments of a central line of a lane according to additional information included in topological graph 400, the additional information including the direction of the lane change. Lane change guide information is therefore provided by routing module 306 for a lane change between a source lane and a target lane in accordance with map and route information 311. In one embodiment, routing module 306 generates topological graph 313. Routing module 306 detects ranges of the source and target lanes for which it is feasible for the vehicle to change lanes. Routing module 306 combines information about the ranges with map and route information 311 and outputs the combined information to a format unit.

Figure 6:
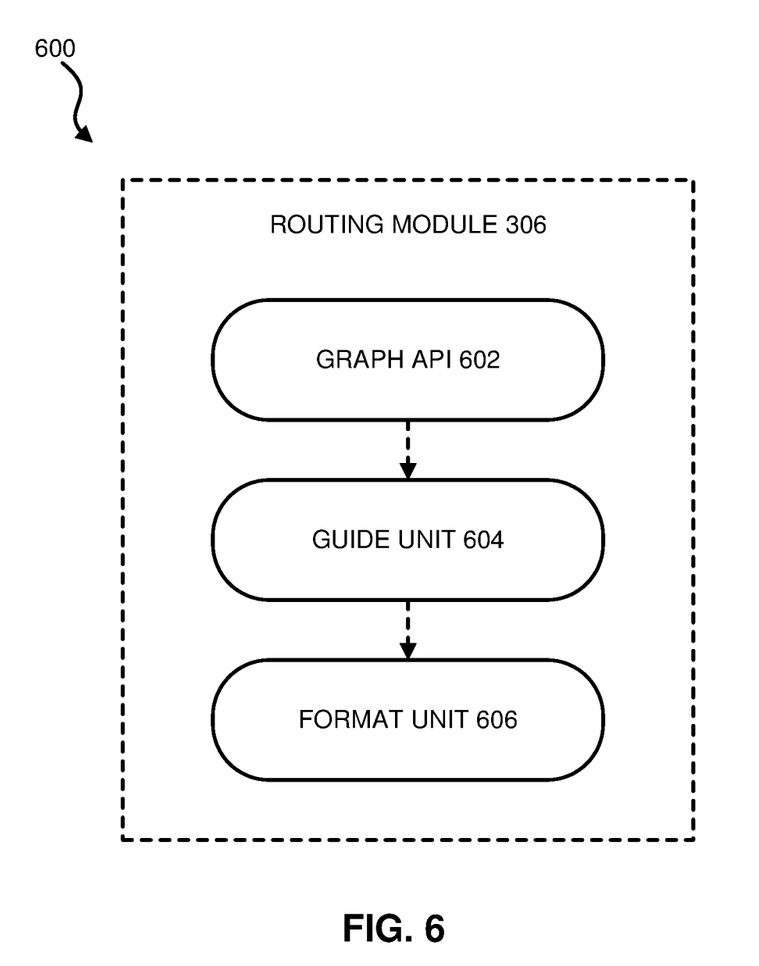
FIG. 6 is a block diagram illustrating an example routing module according to one embodiment.

One example embodiment of a system 600 that may be implemented as part of routing module 306 is discussed in more detail in connection with FIG. 6. As shown in FIG. 6, routing module 306 may include graph API 602, guide unit 604, and format unit 606. Guide unit 604 receives as input the routing result, and performs the processes described herein and in detail with respect to FIG. 7. Format unit 606 receives as input the result output of the process described in connection with FIG. 7, converts it to a format compatible with perception and planning system 110, and passes the converted output back to the perception and planning system 110.

In one embodiment, when a request comes to routing module 306, routing module 306 may parse the context and pass all arguments to graph API 602, then pass the routing result to guide unit 604. Graph API 602 may include a graph loader constructed to build nodes and edges according to graph type, a strategy component constructed to perform the algorithm of FIG. 7 with unified input/output, and a banshee component constructed to publish a routing result via a specific topic. In one embodiment, graph API 602 may include an offline converter that converts map data to a topological graph (e.g., graph 400).

Figure 8:
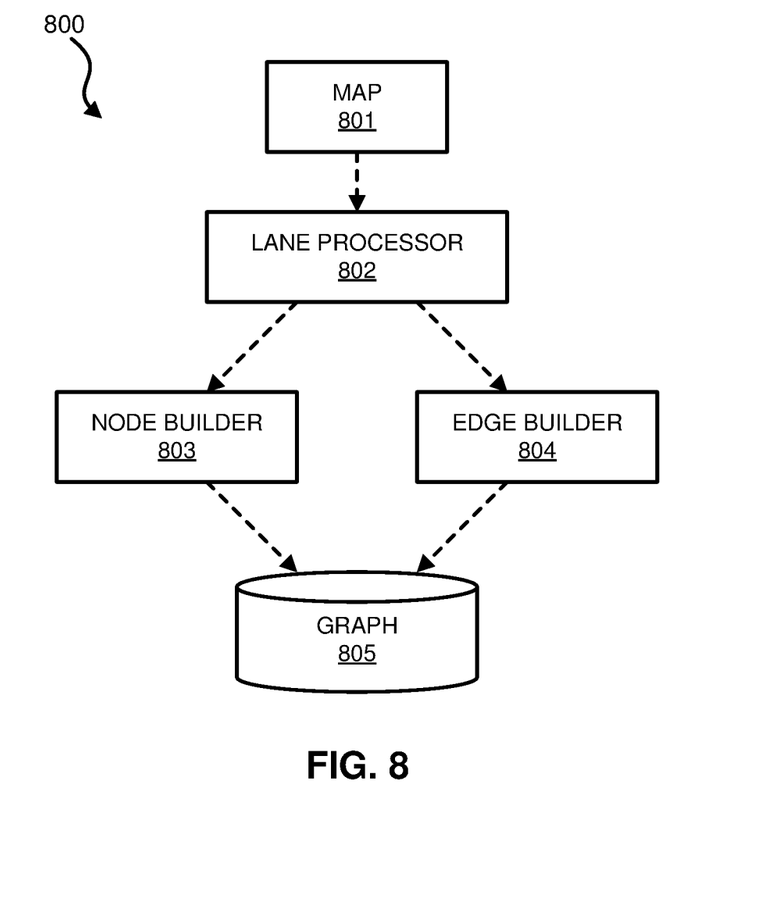
FIG. 8 is a block diagram illustrating an example graph builder according to one embodiment.

One example of a system 800 that may be implemented as part of graph API 602 is shown in FIG. 8. As shown in FIG. 8, system 800 may include lane processor 802 receiving as input map 801, node builder 803 and edge builder 805, to generate graph 805 (which may be, for example graph 400). In one embodiment, based on map 801, lane processor 802 extracts features of a lane and indexes lanes by an identifier. Node builder 803 samples each lane at an interval, selects geographic information, construct the nodes of the topological graph and assigns identifiers to each of the nodes. In one embodiment, the interval may be 3.5 meters. Edge builder 804 determines the passability of each lane (i.e., determines whether it is possible for the vehicle to cross the lane), draws an edge between two feasible nodes (i.e., a pair of nodes between which it is possible for the vehicle to change lanes) and calculates an edge weight.

More specifically, for each lane, if one of the lane's boundaries is passable, nodes are generated at some interval in distance. If the length of a lane is less than then length of the interval, then the ends of the lanes may be designated as its nodes. In one embodiment, for each lane, an edge is drawn between the last node and its successor lane's first node. In one embodiment, for each lane, the nodes are sorted, then an edge is drawn between a node in the source lane and a neighboring node in the target lane. In one embodiment, for each lane, the lane and the lane's successor lanes are stored into a checklist or table.

In one embodiment, the checklist or table may also store lane identifiers for each of the lanes, and may store nodes of each lane along with corresponding node identifiers. In one embodiment, for each node in a source lane, the node is projected to a node in the target lane, taking into consideration the node interval. In one embodiment, if the projection is successful and it has been determined that the lane boundary in that direction is passable, an edge is drawn from the source lane node to the target lane node. In one embodiment, the checklist or table may be optimized using a binary search in both forward and reverse direction.

The information from edge builder 804 and node builder 803 are combined to generate graph 805. In one embodiment, graph 805 may be a graph such as graph 400.

In one embodiment, system 800 generates graph 805 offline. In one embodiment, additional information is included as an edge attribute in the graph, the additional information indicating a direction of a lane change between two feasible nodes. Graph 805 may then be used by routing module 306.

Figure 5:
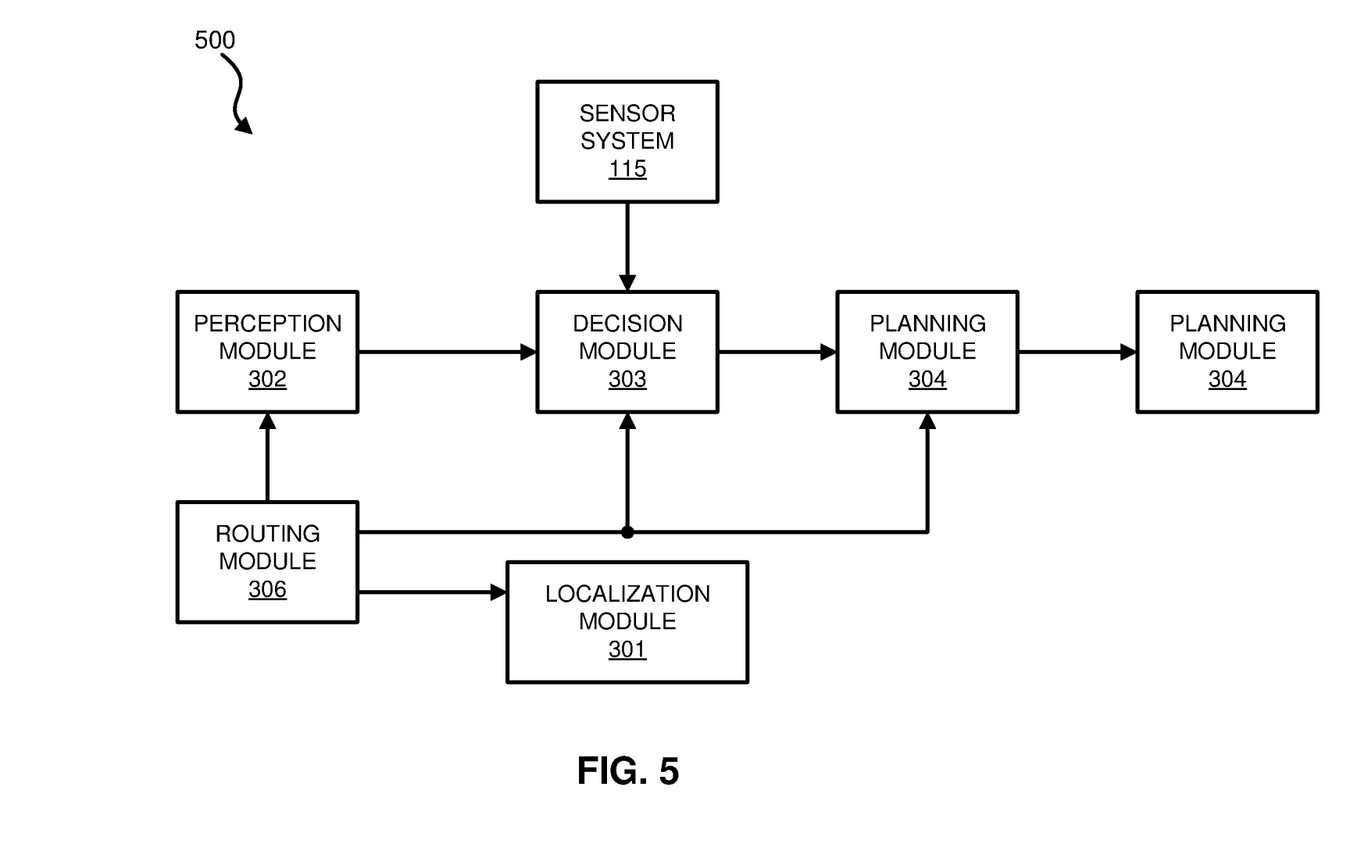
FIG. 5 is a block diagram illustrating an example arrangement of the perception and planning system according to one embodiment.

Referring now to FIG. 5, FIG. 5 is a block diagram illustrating an example system 500 that may be used with an autonomous vehicle 101 according to one embodiment. In particular, system 500 illustrates one example of communicative couplings between some of the components discussed in connection with system 300 of FIG. 3. As shown in FIG. 5, decision module 303 receives input from sensor system 115, perception module 302, and routing module 306. Localization module 301, perception module 302 and planning module 304 also receive input from routing module 306. Control module 305 receives input from planning module 304 to control and drive the vehicle. Although not shown in FIG. 5, Routing module 306 may receive as input map and route information 311 as discussed earlier herein. Also, in one embodiment, routing module 306 outputs to a map library, which communicates with the decision module 303 and the planning module 304.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 7:
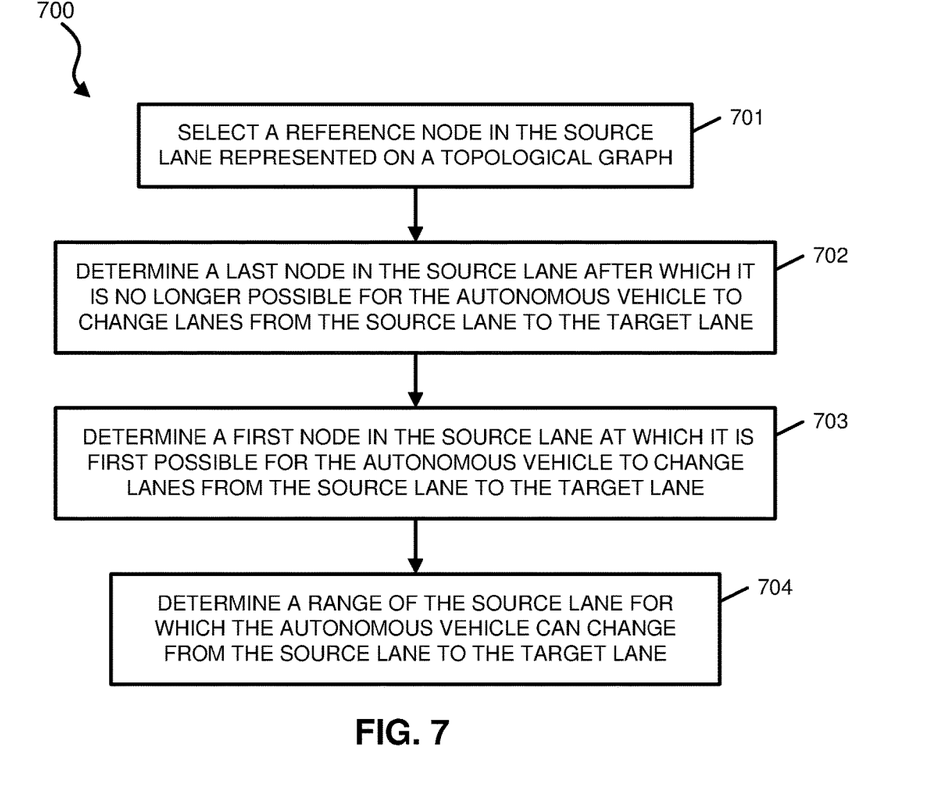
FIG. 7 is a flow diagram illustrating an example process for determining a range for which an autonomous vehicle can change lanes according to one embodiment.

FIG. 7 is a flow diagram for explaining a process of determining a range for which an autonomous vehicle can change lanes according to one embodiment. Process 700 may be performed by processing logic that includes hardware (e.g. circuitry, dedicated logic, etc.), software (e.g., embodied on a non-transitory computer readable medium), or a combination thereof. For example, process 700 may be performed by routing module 306 of FIG. 3.

Referring to FIGS. 4 and 7, the autonomous vehicle may be on a path from a starting location such as location 422 to a destination location such as location 408. While in motion along that path, the vehicle may wish to change lanes from source lane A having central line 402 to target lane B having central line 404. At block 701, a first reference node is selected in source lane A (e.g., node 410). The first reference node 410 may be selected such that it is an ideal or optimal point to change lanes from source lane A to a corresponding node in target lane B (e.g., node 412). For example, the first reference node 410 may be the point at which changing lanes to corresponding node 412 has the lowest cost to the system. In one embodiment, the first reference node 410 is selected using a minimum cost algorithm or a shortest pass algorithm to find an optimal point for the lane change. In one embodiment, the first reference node is selected using a red-black tree to find an optimal point for the lane change. In one embodiment, the first reference node is selected using a Manhattan distance as the Heuristic function to find an optimal point for the lane change. In one embodiment, the first reference node is selected using Euclidean distance as the cost function.

At block 702, a last node (e.g., node 414) is determined in the source lane A after which it is no longer possible for the vehicle to change lanes. In one embodiment, a conditional breadth-first search is successively performed for each of nodes in the source lane A after the first reference node 410 until a node in source lane A (e.g., node 414) is found that does not have a corresponding node in target lane B, the corresponding node being a node in target lane B to which the autonomous vehicle can change from the node in the source lane A. In other words, the search is performed until a node in source lane A is found having a corresponding node in target lane B that is not in the route of target lane B. Thus, nodes of source lane A are searched in a forward direction beginning at first reference node 410 until the current node does not have a feasible edge to a node on central line 404 of target lane B.

In embodiments in which the lanes have been divided into segments, the segments of the source lane A are merged between the first reference node 410 and the last node 414. In one embodiment, segments for the length of target lane B are stored in a table, along with corresponding identifiers for each of the segments. The table may also store the nodes in target lane B to which the vehicle may change lanes from target lane A. In one embodiment, the table may be a hash table. In one embodiment, the search order of the nodes is also indicated in the table.

At block 703 an earliest node (e.g., 416) is determined in the source lane A at which it is first possible for the vehicle to change lanes. Based on the merged segments of source lane A, a length of the source lane A is determined. In one embodiment, a conditional breadth-first search is successively performed for each of the nodes in the target lane B before the node 412 for a length corresponding to a length of the merged segments of the source lane. Each node in the target lane B that is searched before the node 412 for the length is stored in a look up table, along with corresponding node identifiers. The nodes of the source lane A are iterated in a reverse direction beginning at the node 414 until a node (e.g., 416) in the source lane A is found that does not have a corresponding node in the target lane B stored in the look up table. This is the earliest node 416 that the vehicle can change lanes.

At block 704, a range of the source lane A for which the autonomous vehicle can change from the source lane to the target lane is determined, the range being defined from the earliest node in the source lane determined at block 703 to the last node in the source lane determined at block 702. In one embodiment, based on the range of the source lane A, the range of target lane B is determined to which it is possible for the vehicle to change lanes. The range of the source lane can then be utilized by planning module 304 and/or control module 305 to control the vehicle to change from the source lane to the target lane. For example, planning module 304 and/or control module 305 can decide when to change lane, the speed of lane changing, and a distance to change lane, etc. based on the determined rage of source lane.

Figure 9:
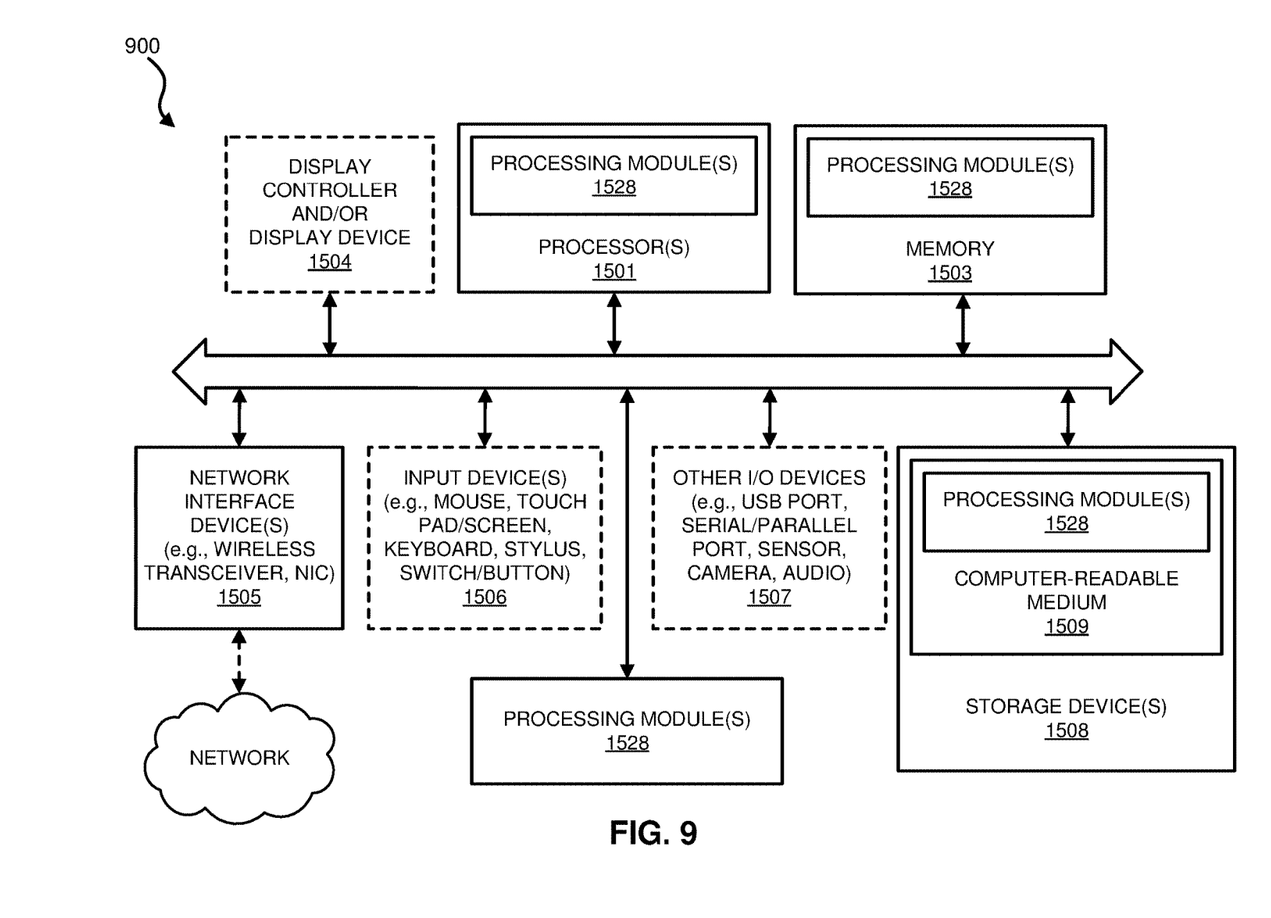
FIG. 9 is a block diagram illustrating a data processing system according to one embodiment.

FIG. 9 is a block diagram illustrating an example of a data processing system which may be used with embodiments herein. For example, system 900 may represent any of data processing systems described above performing any of the processes or methods described above, such as, for example, the processes performed by routing module 306 and the method discussed in connection with FIG. 7. System 900 may include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 900 is intended to show a high level view of many components of the computer system. However, it is to be understood that additional components may be present in certain implementations and furthermore, different arrangement of the components shown may occur in other implementations. System 900 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 900 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 900 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 900 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 900.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, localization module 301, perception module 302, decision module 303, planning module 304, control module 305 and routing module 306. Processing module/unit/logic 1528 may also reside, completely or at least partially, within memory 1503 and/or within processor 1501 during execution thereof by data processing system 900, memory 1503 and processor 1501 also constituting machine-accessible storage media. Processing module/unit/logic 1528 may further be transmitted or received over a network via network interface device 1505.

Computer-readable storage medium 1509 may also be used to store some or all of the software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies disclosed herein. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 900 is illustrated with various components of a data processing system, it is not intended to represent any particular architecture or manner of interconnecting the components; as such details are not germane to embodiments herein. It will also be appreciated that network computers, handheld computers, mobile phones, servers, and/or other data processing systems which have fewer components or perhaps more components may also be used with embodiments herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments herein also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments herein are not described with reference to any particular programming language. It will be appreciated that a variety of programming languages may be used to implement the teachings of embodiments as described herein.

In the foregoing specification, embodiments herein have been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A computer-implemented method of operating an autonomous vehicle to change lanes from a source lane to a target lane, the method comprising:
   selecting a first reference node of a topological graph associated with the source lane, the first reference node being a node in the source lane at which the autonomous vehicle can change lanes to a second reference node in the target lane;

determining, with respect to the first reference node of the topological graph, an earliest node in the source lane at which it is first possible for the autonomous vehicle to change lanes from the source lane to the target lane;

determining, with respect to the first reference node of the topological graph, a last node in the source lane after which it is no longer possible for the autonomous vehicle to change lanes from the source lane to the target lane;

determining a range of the source lane for which the autonomous vehicle can change lanes from the source lane to the target lane, wherein the range is from the earliest node in the source lane to the last node in the source lane; and generating a trajectory to autonomously control the autonomous vehicle to change lanes from the source lane the target lane within the range, including determining time, a speed, and a distance to change lanes.

2. The method of claim 1 wherein the first reference node is selected using a minimum cost algorithm, an initial start location of the autonomous vehicle and a final destination location of the autonomous vehicle.

3. The method of claim 1 wherein the first reference node, the earliest node and the last node are all located on a central axis of the source lane being represented on the topological graph and wherein the second reference node is located on a central axis of the target lane being represented on the topological graph.

4. The method of claim 3 wherein the central axes of the source and target lanes include nodes at a predetermined interval along the central axes.

5. The method of claim 1 wherein determining the last node comprises:

performing a conditional breadth-first search for nodes in the source lane after the first reference node until a node in the source lane is found that does not have a corresponding node in the target lane, the corresponding node in the target lane being a node at which the autonomous vehicle can change lanes from the node in the source lane to the node in the target lane, wherein segments of the source lane are merged between the first reference node in the source lane and the last node.

6. The method of claim 5 wherein determining the earliest node comprises:

performing a conditional breadth-first search for nodes in the target lane before the second reference node for a length corresponding to a length of the merged segments of the source lane, wherein each node in the target lane that is searched before the second reference node for the length is stored in a look up table.

7. The method of claim 6 wherein determining the earliest node further comprises:

traversing nodes of the source lane in a reverse direction beginning at the first reference node until a node in the source lane is found that does not have a corresponding node in the target lane stored in the look up table, the corresponding node in the target lane being a node at which the autonomous vehicle can change lanes from the node in the source lane to the node in the target lane.

8. A non-transitory machine-readable medium having instructions stored therein, which when executed by a processor, cause the processor to perform operations of operating an autonomous vehicle to change lanes from a source lane to a target lane, the operations comprising:

selecting a first reference node of a topological graph associated with the source lane, the first reference node being a node in the source lane at which the autonomous vehicle can change lanes to a second reference node in the target lane;

determining, with respect to the first reference node of the topological graph, an earliest node in the source lane at which it is first possible for the autonomous vehicle to change lanes from the source lane to the target lane;

determining, with respect to the first reference node of the topological graph, a last node in the source lane after which it is no longer possible for the autonomous vehicle to change lanes from the source lane to the target lane;

determining a range of the source lane for which the autonomous vehicle can change lanes from the source lane to the target lane, wherein the range is from the earliest node in the source lane to the last node in the source lane; and generating a trajectory to autonomously control the autonomous vehicle to change lanes from the source lane to the target lane within the range, including determining time, a speed, and a distance to change lanes.

9. The non-transitory machine-readable medium of claim 8 wherein the first reference node is selected using a minimum cost algorithm, an initial start location of the autonomous vehicle and a final destination location of the autonomous vehicle.

10. The non-transitory machine-readable medium of claim 8 wherein the first reference node, the earliest node and the last node are all located on a central axis of the source lane being represented on the topological graph and wherein the second reference node is located on a central axis of the target lane being represented on the topological graph.

11. The non-transitory machine-readable medium of claim 10 wherein the central axes of the source and target lanes include nodes at a predetermined interval along the central axes.

12. The non-transitory machine-readable medium of claim 8 wherein determining the last node comprises:

performing a conditional breadth-first search for nodes in the source lane after the first reference node until a node in the source lane is found that does not have a corresponding node in the target lane, the corresponding node in the target lane being a node at which the autonomous vehicle can change lanes from the node in the source lane to the node in the target lane, wherein segments of the source lane are merged between the reference node in the source lane and the last node.

13. The non-transitory machine-readable medium of claim 12 wherein determining the earliest node comprises:

performing a conditional breadth-first search for nodes in the target lane before the second reference node for a length corresponding to a length of the merged segments of the source lane, wherein each node in the target lane that is searched before the second reference node for the length is stored in a look up table.

14. The non-transitory machine-readable medium of claim 13 wherein determining the earliest node further comprises:

traversing nodes of the source lane in a reverse direction beginning at the first reference node until a node in the source lane is found that does not have a corresponding node in the target lane stored in the look up table, the corresponding node in the target lane being a node at which the autonomous vehicle can change lanes from the node in the source lane to the node in the target lane.

15. A data processing system, comprising:
a processor; and
a memory coupled to the processor to store instructions, which when executed by the processor, cause the processor to perform operations of operating an autonomous vehicle to change lanes from a source lane to a target lane, the operations including:
- selecting a first reference node of a topological graph associated with the source lane, the first reference node being a node in the source lane at which the autonomous vehicle can change lanes to a second reference node in the target lane,
- determining, with respect to the first reference node of the topological graph, an earliest node in the source lane at which it is first possible for the autonomous vehicle to change lanes from the source lane to the target lane,
- determining, with respect to the first reference node of the topological graph, a last node in the source lane after which it is no longer possible for the autonomous vehicle to change lanes from the source lane to the target lane,
- determining a range of the source lane for which the autonomous vehicle can change lanes from the source lane to the target lane, wherein the range is from the earliest node in the source lane to the last node in the source lane, and
- generating a trajectory to autonomously control the autonomous vehicle to change lanes from the source lane to the target lane within the range, including determining time, a speed, and a distance to change lanes.

16. The data processing system of claim 15 wherein the first reference node is selected using a minimum cost algorithm, an initial start location of the autonomous vehicle and a final destination location of the autonomous vehicle.

17. The data processing system of claim 15 wherein the first reference node, the earliest node and the last node are all located on a central axis of the source lane being represented on the topological graph and wherein the second reference node is located on a central axis of the target lane being represented on the topological graph.

18. The data processing system of claim 17 wherein the central axes of the source and target lanes include nodes at a predetermined interval along the central axes.

19. The data processing system of claim 15 wherein determining the last node comprises:
- performing a conditional breadth-first search for nodes in the source lane after the first reference node until a node in the source lane is found that does not have a corresponding node in the target lane, the corresponding node in the target lane being a node at which the autonomous vehicle can change lanes from the node in the source lane to the node in the target lane,
- wherein segments of the source lane are merged between the reference node in the source lane and the last node.

20. The data processing system of claim 19 wherein determining the earliest node comprises:
- performing a conditional breadth-first search for nodes in the target lane before the second reference node for a length corresponding to a length of the merged segments of the source lane, wherein each node in the target lane that is searched before the second reference node for the length is stored in a look up table.

21. The data processing system of claim 20 wherein determining the earliest node further comprises:
- traversing nodes of the source lane in a reverse direction beginning at the first reference node until a node in the source lane is found that does not have a corresponding node in the target lane stored in the look up table, the corresponding node in the target lane being a node at which the autonomous vehicle can change lanes from the node in the source lane to the node in the target lane.

* * * * *